Patented Dec. 26, 1944

2,365,894

UNITED STATES PATENT OFFICE 2,365,894

ISOMERIZATION OF NAPHTHENES

William J. Mattox, Riverside, Ill., assignor to Universal Oil Products Company, Chicago, Ill., a corporation of Delaware No Drawing. Application December 17, 1943, Serial No. 514,661

11 Claims. (Cl. 260—666)

This invention relates to the isomerization of naphthenic hydrocarbons in the presence of a solid catalyst which possesses many advantages over the catalysts previously employed in the isomerization art.

The isomerization of certain dimethylcyclohexanes in the presence of aluminum chloride and hydrogen chloride has been previously reported. For example, Schuit, Hoog, and Verhaus, J. Rec. trav. chim., 59, 793–810 (1940) report the isomerization of 1,1-dimethylcyclohexane to a mixture of 1,2-dimethylcyclohexane, 1,3-dimethylcyclohexane, and 1,4-dimethylcyclohexane using aluminum chloride and hydrogen chloride at 80° C. under pressure.

However, as is well known in the hydrocarbon conversion art, aluminum chloride catalysts have certain inherent disadvantages, principally their high degree of activity which makes necessary the use of carefully controlled conditions, and their tendency toward "sludging" or the formation of aluminum chloride-hydrocarbon complexes which result in high catalyst consumption. I have now found that alkyl cyclohexanes can be successfully isomerized to alkyl cyclohexanes of different molecular structure in the presence of silica-alumina catalysts including the clay catalysts such as the naturally occurring earths, clays, or hydrosilicates as well as synthetic composites of silica and alumina. The silica-alumina catalysts are inexpensive and are easily prepared. They are easily handled in a variety of techniques; they possess a relatively long life; and they can be readily regenerated when the catalytic activity declines.

Broadly, the invention relates to the isomerization of alkyl cyclohexane hydrocarbons in the presence of a silica-alumina catalyst.

In one specific embodiment the invention comprises contacting an alkyl cyclohexane with a calcined composite of the hydrogels of silica and alumina under isomerizing conditions of temperature, pressure, and reaction time and recovering from the reaction products at least one alkyl cyclohexane having a different molecular structure but the same molecular weight.

As will be described hereinafter in greater detail, one of the most important embodiments of my invention comprises a process for the production of ortho-diethylcyclohexane by the isomerization of meta- and para-diethylcyclohexanes or mixtures thereof. Ortho-diethylcyclohexane is a valuable intermediate in organic syntheses and may be converted to naphthalene, phthalic anhydride, or other valuable compounds.

In general two types of isomerization of alkyl cyclohexanes is found:

(1) Shifting of intact alkyl side chains along the cyclohexane ring as illustrated by the following equations wherein meta- and para-diethylcyclohexane are isomerized to ortho-diethylcyclohexane.

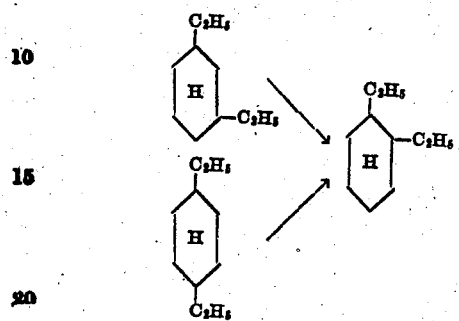

(2) Rupture of an alkyl side chain and redistribution of smaller alkyl radicals along the cyclohexane ring as illustrated by the following equation wherein propylcyclohexane is isomerized to 1,3,5-trimethylcyclohexane.

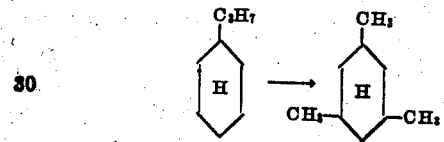

Both of the above types of isomerization are included within the scope of the present invention and both are obtained under suitably controlled conditions of operation. The nature of the isomerization products will, of course, depend on the charging stock, the operating conditions, and other factors. In most cases it will be desirable to conduct a few small scale experiments in order to select the optimum conditions of temperature, pressure, and reaction time which are necessary to obtain the desired isomerization product from the particular charging stock which is available. In general, isomerization of type 1 is obtained more readily with methyl and ethyl cyclohexanes. With alkyl cyclohexanes having longer side chains there is a greater tendency to obtain the isomerization designated as type 2.

Thus, it is within the scope of my invention to effect the isomerization of dimethylcyclohexane to different dimethylcyclohexanes, ethylcyclohexane to dimethylcyclohexane, diethylcyclohexane to different diethylcyclohexanes, diethylcyclohexane to tetramethylcyclohexane, normal-propylcyclohexane to trimethylcyclohexane, isopropylcyclohexane to trimethylcyclohexane, propylcyclohexane to methylethylcyclohexane, normal, secondary, or tertiary butyl cyclohexane to tetramethylcyclohexanes, amylcyclohexane to pentamethylcyclohexane, etc.

The catalysts employed in the present process comprise broadly silica-alumina composites or, as commonly referred to, associations of silicon oxide and aluminum oxide. The naturally occurring earths and clays such as diatomaceous or infusorial earth, pumice, fuller's earth, kaolin, montmorillonite, bentonite, etc., may be employed. These earths and clays are often subjected to an acid pretreatment in order to increase their catalytic activity. The preferred catalysts of the process are the synthetic composites of silica and alumina comprising generally a calcined composite of the hydrogels of silica and alumina. These hydrogels may be prepared according to any of the methods well-known in the art.

It is also within the scope of the invention to employ catalysts comprising composites of silica with other oxides, e. g. silica-alumina-zirconia, silica-thoria, silica-boria, silica-magnesia, etc. However, it will generally be necessary to correlate the operating conditions of the process with the nature of the catalyst employed in order to obtain efficient operation of the process.

The isomerized alkyl cyclohexanes which are obtained as products of the present invention are useful materials in organic synthesis and may also be employed as components of motor fuels. The methylcyclohexanes which may be charged to the process are generally found in straight run hydrocarbon fractions such as straight run gasolines. Charging stocks comprising the higher molecular weight alkyl cyclohexanes may be obtained from various hydrocarbon conversion processes, for example by the hydrogenation of alkyl benzenes obtained from various benzene alkylation steps.

The isomerization of alkylcyclohexanes in the presence of a silica-alumina catalyst may be carried out at a temperature of from about 250° C. to about 550° C. In general atmospheric pressure is suitable but subatmospheric pressures as low as about 0.1 atmosphere and superatmospheric pressures as high as about 1000 pounds per square inch may also be employed. As previously indicated small scale experimental tests are usually desirable in order to determine the optimum conditions of temperature, pressure, and reaction time which must be employed with the particular charging stock available. The silica-alumina catalysts may be employed according to many of the usual hydrocarbon conversion techniques employing a solid catalyst. Under most operating conditions contamination of the silica-alumina catalyst with carbonaceous deposits is negligible. Accordingly, a convenient operating technique comprises the fixed bed method of operation wherein the charging stock is passed under suitable conditions of temperature, pressure, and flow rate through a reaction zone containing a mass of silica-alumina catalyst. The effluent reaction products are separated by fractionation or other suitable means; the desired isomerization products are recovered; and unconverted reactants are recycled to the reaction zone. Under relatively severe operating conditions a certain amount of dealkylation or splitting off of alkyl side chains may occur resulting in olefin production and possible contamination of the catalyst with a carbonaceous deposit. Under such circumstances the catalyst may be readily regenerated with an oxygen-containing gas whereby to remove the carbonaceous contaminants by combustion thereof. The silica-alumina catalyst may also be employed in subdivided or powdered form according to the so-called fluidized or moving bed techniques now well-known in the hydrocarbon conversion art.

One of the most important applications of my process is in the production of ortho-diethylcyclohexane from meta- or para-diethylcyclohexane or mixtures thereof. Ortho-diethylcyclohexane may be converted into naphthalene by dehydrogenation at high temperatures in the presence of catalysts comprising the oxides of the metals from groups V and VI of the periodic table, whereas meta- and para-diethylcyclohexanes obviously cannot yield napthalene upon dehydrogenation. If ortho-diethylcyclohexane is dehydrogenated at relatively low temperatures in the presence of nickel, platinum, or palladium catalysts the corresponding alkyl aromatic hydrocarbon is formed which upon oxidation may be converted to phthalic anhydride.

The following example is given to illustrate the latter embodiment of my invention but it is in no way intended to limit the generally broad scope of the invention.

A diethylcyclohexane fraction consisting essentially of the meta and para isomers was vaporized and passed at atmospheric pressure over a synthetic silica-alumina composite obtained by calcining a mixture of the hydrogels of silica and alumina. The temperature in the reaction zone was 400° C. and the liquid hourly space velocity defined as the volumes of liquid hydrocarbon passed through the catalyst zone per volume of catalyst per hour was approximately 0.5.

The total reaction products after 2½ hours of operation were subjected to fractional distillation, and 63% by volume of a diethylcyclohexane fraction was separated which contained approximately 50% ortho-diethylcyclohexane. Two representative cuts from the diethylcyclohexane fraction in the product had refractive indices at 20° C. of 1.4460 and 1.4438. Further proof of the presence of the ortho-diethyl-cyclohexane was obtained by dehydrogenation to naphthalene in the presence of a chromia-alumina catalyst.

I claim as my invention:

1. An isomerization process which comprises contacting an alkylcyclohexane with a silica-alumina catalyst under isomerizing conditions and recovering from the reaction products at least one alkylcyclohexane having a different molecular structure and the same molecular weight as the alkylcyclohexane originally charged.

2. The process of claim 1 wherein the isomerization products comprise at least one alkylcyclohexane wherein the alkyl side chains contain the same number of carbon atoms as the alkylcyclohexane originally charged.

3. The process of claim 1 wherein the isomerization products comprise at least one alkylcyclohexane containing an alkyl side chain of fewer carbon atoms than a side chain of the alkylcyclohexane originally charged.

4. The process of claim 1 wherein said isomerization is conducted at a temperature of from about 250° C. to about 550° C.

5. The process of claim 1 wherein the catalyst comprises a calcined composite of the hydrogels of silica and alumina.

6. The process of claim 1 wherein the catalyst comprises a clay catalyst.

7. The process of claim 1 wherein the alkylcyclohexane charged comprises a methylcyclohexane.

8. The process of claim 1 wherein the alkylcyclohexane charged comprises an ethylcyclohexane.

9. An isomerization process which comprises contacting meta-diethylcyclohexane with a silica-alumina catalyst under isomerizing conditions and recovering ortho-diethylcyclohexane from the reaction products.

10. An isomerization process which comprises contacting para-diethylcyclohexane with a silica-alumina catalyst under isomerizing conditions and recovering ortho-diethylcyclohexane from the reaction products.

11. An isomerization process which comprises contacting an alkylcyclohexane with a silica-containing catalyst under isomerizing conditions and recovering from the reaction products at least one alkylcyclohexane having a different molecular structure and the same molecular weight as the alkylcyclohexane originally charged.

WILLIAM J. MATTOX.